(No Model.)
F. W. READ.
WEED PULLER.
No. 547,679. Patented Oct. 8, 1895.
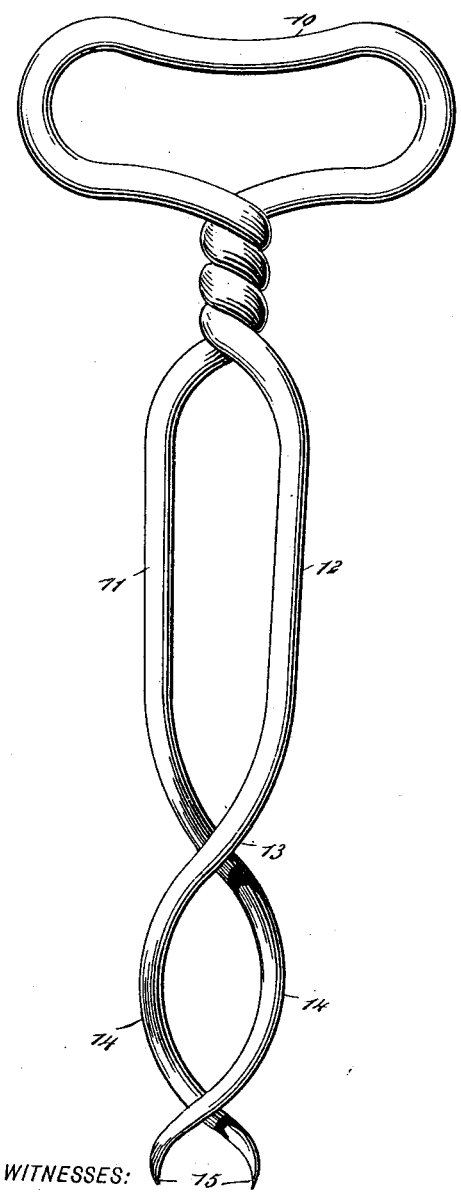
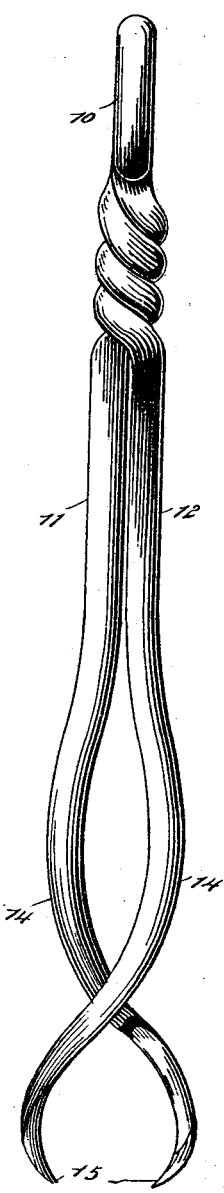

UNITED STATES PATENT OFFICE.

FREDERICK W. READ, OF MARQUETTE, MICHIGAN.

WEED-PULLER.

SPECIFICATION forming part of Letters Patent No. 547,679, dated October 8, 1895.

Application filed June 7, 1895. Serial No. 552,026. (No model.)

*To all whom it may concern:*

Be it known that I, FREDERICK W. READ, of Marquette, in the county of Marquette and State of Michigan, have invented a new and Improved Weed-Puller, of which the following is a full, clear, and exact description.

My invention relates to a weed-puller; and it has for its object to provide a puller of simple and economic construction, so formed that dandelions or any weed may be withdrawn expeditiously and conveniently from a lawn or from the ground, removing not only the foliage, but likewise the entire root.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both the figures.

Figure 1 is a front elevation of the tool, and Fig. 2 is a side elevation thereof.

In carrying out the invention the tool is preferably made of rod or bar steel, which material is twisted or otherwise manipulated to form a handle 10 at the upper end, preferably horizontally located, and twin shanks 11 and 12 below the handle. These shanks are outwardly curved or curved in direction of front and back in opposite directions, and near their lower ends are made to cross one another, as shown at 13 in the drawings, each of the shanks being given somewhat of a spiral form, and below the crossing 13 the shanks are curved sidewise in opposite directions, as shown at 14, causing the space between the shanks to be somewhat of oval form, while the terminals of the shanks or their lower extremities are curved likewise in opposite directions and made to substantially approach one another in a spiral direction, the terminals being likewise pointed to a predetermined extent. Thus by entering the terminals 15 in the ground the tool may be worked in the same manner as an auger around the root of the plant or weed, and when buried deep enough in the ground by a quick upward movement of the tool the weed, foliage, root, and surrounding earth will be removed, thus effectually cleaning a lawn or other surface from any objectionable plant.

Having thus described my invention, I claim as new and desire to secure by Letters Patent—
A weed puller, the same consisting of a rod or bar bent at the center and twisted to form a handle at the upper end, the material extending from the twisted portion in the form of twin shanks, the shanks being substantially parallel for part of their length and being then given a spiral twist in opposite directions, whereby one shank will cross the other, the termination of the shanks being made to approach one another in a spiral direction, as and for the purpose specified.

FREDERICK W. READ.

Witnesses:
J. H. GODWIN,
E. P. STRONG.